United States Patent [19]
Arad et al.

[11] Patent Number: 5,281,143
[45] Date of Patent: Jan. 25, 1994

[54] LEARNING DOLL

[75] Inventors: Avi Arad, Westport, Conn.; Robert W. Jeffway, Jr., Northampton, Mass.

[73] Assignee: Toy Biz, Inc., New York, N.Y.

[21] Appl. No.: 880,565

[22] Filed: May 8, 1992

[51] Int. Cl.$^5$ .................. G09B 19/04; A63H 3/28
[52] U.S. Cl. ........................... 434/185; 446/297
[58] Field of Search .............. 434/185; 446/268, 297, 446/397

[56] References Cited

U.S. PATENT DOCUMENTS

| | | | |
|---|---|---|---|
| 4,221,927 | 9/1980 | Dankman et al. | 446/297 |
| 4,249,338 | 2/1981 | Wexler | 446/297 |
| 4,675,519 | 6/1987 | Price | 250/209 |
| 4,840,602 | 6/1989 | Rose | 446/175 |
| 5,052,969 | 10/1991 | Smith | 446/268 |

FOREIGN PATENT DOCUMENTS

3345978 6/1985 Fed. Rep. of Germany ...... 446/297

*Primary Examiner*—John J. Wilson
*Assistant Examiner*—Cindy A. Cherichetti
*Attorney, Agent, or Firm*—Amster, Rothstein & Ebenstein

[57] ABSTRACT

A doll, apparently capable of learning through a combination of human speech and touch interaction, includes a speech generator for generating upon actuation the currently indexed sound in a predetermined sequence of sounds. The sequence of sounds evidences a stepwise learning process defined by a plurality of learning steps, each step being composed in turn of a predetermined subsequence of wrong sounds followed by correct sounds. A speech detector detects human speech when energized and, in response thereto, indexes the subsequence of sounds to the next sound within the current step and actuates the speech generator and, at the end of each step, indexes the sequence of sounds to the first sound of the next step and causes the speech generator to request the selected touch. A touch detector detects a selected touch when energized and, in response thereto, actuates the speech generator. The speech generator is responsive to each appropriate actuation of the speech and touch detectors for promptly generating the currently indexed sound after deactuation of the speech and touch detectors.

19 Claims, 6 Drawing Sheets

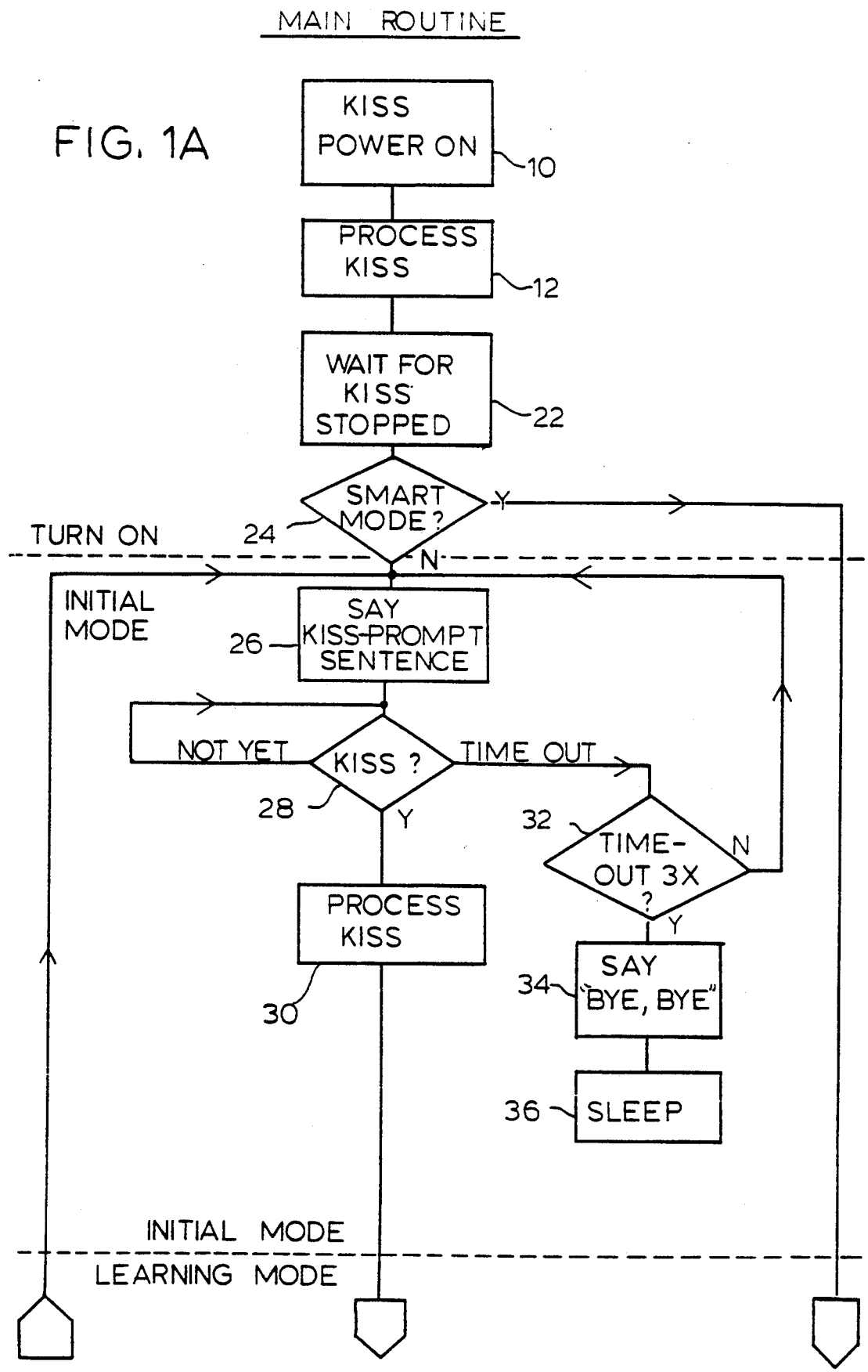

LEARNING DOLL

BACKGROUND OF THE INVENTION

The present invention relates to a doll, and more particularly to a doll which is apparently capable of learning in response to human voice and touch interaction.

Among the wide variety of interactive dolls (that is, dolls which are capable of responding to particular types of human interaction) are dolls which open and shut their eyes, produce sounds (whether speech or other sounds, and whether accompanied by mouth movement or not), urinate, defecate, cry, and the like. Typically, the interaction is extremely limited in nature—for example, the doll opens and shuts its eyes in response to movement of the doll and/or urinates or defecates in response to the introduction of fluid or solids, respectively. The dolls which talk are capable of a prolonged interaction—for example, telling one or more lengthy stories, singing a variety of songs, or the like—yet a child playing with such a doll is only passively engaged through the act of listening for the most part, perhaps with occasional input from the child in the form of a selection of the particular story or song to be heard. Due to the limited attention span of a child, and since the doll does not require the full, active attention of the child, the child may lose interest in the doll and have his attention diverted elsewhere even while the doll is continuing to speak or sing.

It has been said that the best way to learn is to teach. While it cannot be gainsaid that there is educational value in having a child listen to a story spoken by a doll, the educational value is quite limited since the child is essentially passive in the process. If a child had a more active role to perform in his interaction with the doll, and particularly if the child were attempting to educate the doll, the child's attention would be less likely to be diverted and the child would be more likely to learn that which he is teaching. The ability of a child to teach a doll is especially attractive to the child since most of the time he is being taught by adults and has little opportunity to teach someone himself. While the fertile imagination of a child may create situations in which he tells the doll to do things and the doll responds appropriately (typically because the child has pressed appropriate buttons or the like), such activity does not truly simulate the learning process, which typically involves making errors initially and then, upon correction, learning to perform without error the matter which has been taught.

Accordingly, the present invention provides a doll which is apparently capable of learning in response to human interaction.

Another object is to provide such a doll which is capable of learning in response to being kissed and spoken to by a child.

A further object is to provide such a doll which requires constant interaction from a child and thus maintains the interest of the child over a prolonged period of time.

It is also an object to provide such a doll which initially makes errors in speech but, in response to interaction with the child, apparently learns to correct these errors.

SUMMARY OF THE INVENTION

It has now been found that the above and related objects of the present invention are obtained in a doll apparently capable of learning through a combination of human speech and touch interaction. In its basic aspects, the doll comprises speech generation means, speech detection means and touch detection means. The speech generation means is for generating upon actuation the currently indexed sound in a predetermined sequence of sounds. The sequence of sounds evidences a stepwise learning process defined by a plurality of learning steps, each step being composed in turn of a predetermined subsequence of wrong sounds followed by correct sounds. The speech detection means is for detecting human speech when energized and, in response thereto, indexing the subsequence of sounds to the next sound within the current step and actuating the speech generations means, and, at the end of each step, indexing the sequence of sounds to the first sound of the next step and causing the speech generation means to request the selected touch. The touch detection means is for detecting a selected touch when energized and, in response thereto, for actuating the speech generation means. The speech generation means is responsive to each appropriate actuation of the speech and touch detection means for promptly generating the currently indexed sound after deactuation of the speech and touch detection means.

Preferably the last sound of the subsequence of sounds of each step is an improvement over the other sounds of the step, and successive steps of the predetermined sequence of sounds evidence an improvement in word vocabulary, correctness of grammar or implied intellect.

In a preferred embodiment, the speech generation means at the end of each step evidences completion of the step, energizing the touch detection means, deenergizing the speech detection means, and requesting the selected touch. The touch detection means is energized at the end of each step and deenergized after it detects the selected touch. The touch detection means, upon its initial actuation by an initial selected touch, causes the speech generation means to request the selected touch again. In the absence of the selected touch after a request therefor, the touch detection means after a predetermined time interval after energization thereof causes the speech generation means to generate at least one prompting sound again requesting the selected touch and then, in the absence of the selected touch for a predetermined time, to generate a termination sound. The speech detection means is energized when the touch detection means detects the selected touch and deenergized at the end of each step. The speech means detection means may include means for at least partially discriminating between human speech and other ambient sounds.

The doll may include various optional features. The doll may include speech prompting means, responsive to non-actuation of the speech detection means for a predetermined period of time after energization thereof, for causing the speech generation means to generate at least one speech prompting sound. Preferably the speech prompting means causes the speech generation means to generate a plurality of prompting sounds, unless interrupted by actuation of the speech detection means, and the speech generation means, after each speech prompting sound, repeats the currently indexed sound. The doll may additionally include touch prompting means, responsive to non-actuation of the touch detection means for a predetermined period of time after energization thereof, for causing the speech generation means to generate at least one touch prompting sound. Preferably the touch prompting means causes the speech generation means to generate a plurality of touch prompting sounds unless interrupted by actuation of the touch detection means. The doll may further include termination means, responsive to non-actuation of the speech detection means for a predetermined period of time, for causing the speech generation means to generate a termination sound, deenergize the speech detection means, and energize the touch detection means. The doll may also include manually operable forget means for resetting the currently indexed sound of the sequence of sounds to the first sound of the first step.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIGS. 1A, 1B and 1C constitute a flowchart of the activity of a doll according to the present invention;

DETAILED DESCRIPTION OF THE PREFERRED EMBODIMENTS

A doll according to the present invention is preferably in the form of a human baby, although it may also be in the form of an animal, cartoon character, or the like, to which a child can favorably relate. Regardless of the form, the doll incorporates two sensing mechanisms: a speech detection mechanism and a touch detection mechanism.

While the touch detection mechanism could simply be a switch which is manually actuatable by the child, preferably the touch detection mechanism is designed to respond to a kiss. Thus the head of the doll may be pivotably mounted on the body of the doll in such a manner, that when the lips of the child press against the lips of the doll, the head is resiliently pivoted backwards, thereby to actuate a touch detection switch. A kiss activated switch of this type is disclosed in U.S. Pat. No. 5,052,969. It will be appreciated, however, that while the present specification refers to the touch as a "kiss," in fact other touches may be required instead of a kiss.

The speech detection mechanism merely determines whether or not there is any sound in the vicinity of the doll, with either the speech detection mechanism itself or the software associated with the doll preferably making at least a rudimentary discrimination between "speech" and "noise." As illustrated, the sound detection mechanism only determines whether or not there is sound of an appropriate amplitude, with the software discriminating between noise and speech at a rudimentary level by analyzing whether or not the sound is relatively brief (as might be produced merely by rustling of clothing on the doll) or relatively prolonged (as would typically be the case where a child was speaking to the doll).

Figure 1B:
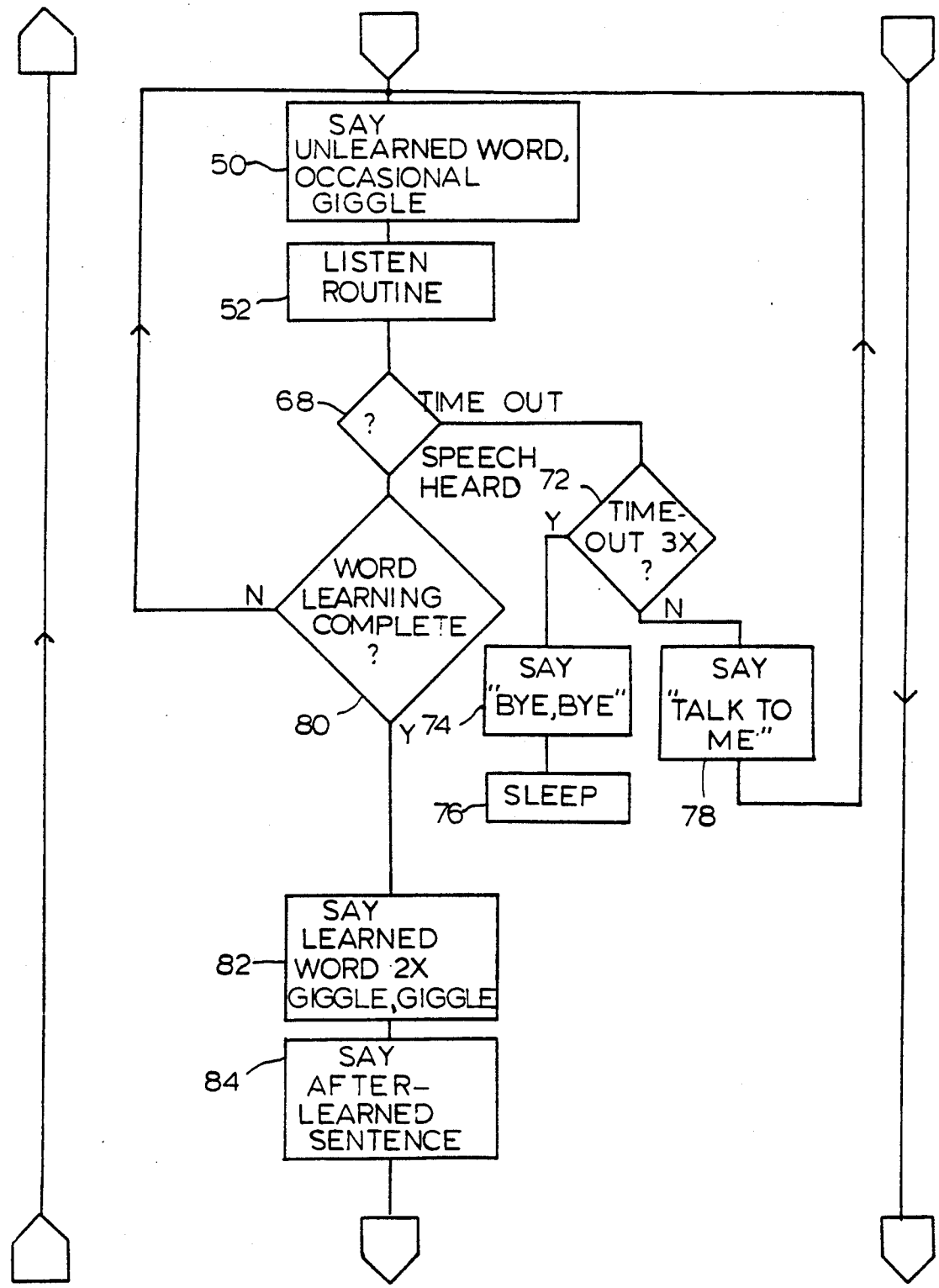
Figure 1C:
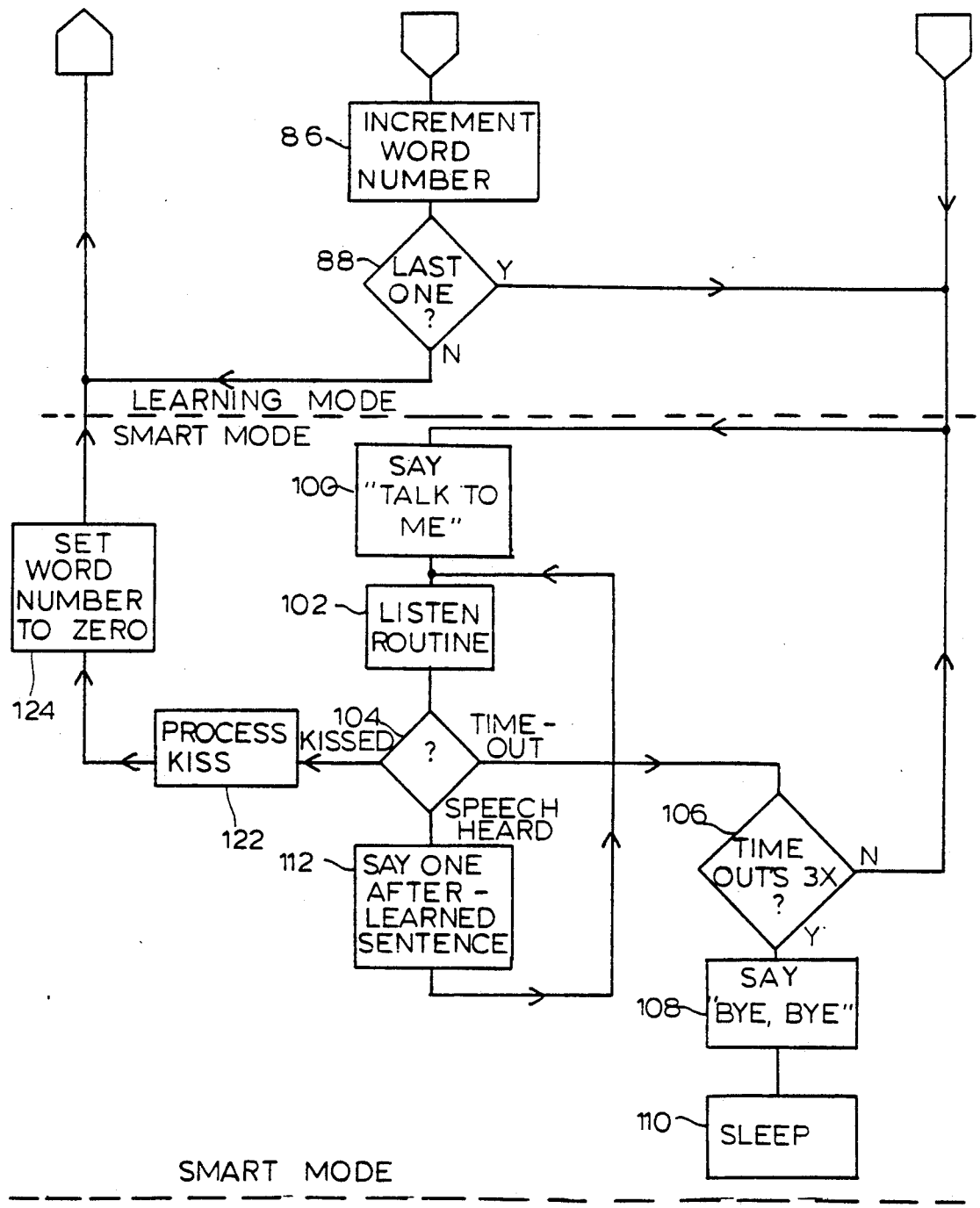

Referring now to the drawing, and in particular to FIG. 1 thereof, the doll operates in three different basic modes: an initial mode, a learning mode, and a smart mode. In the initial mode, the only action required of the child is a kiss (or the other preselected touch to which the touch detection mechanism is sensitive). Assuming the kiss is received, after this very brief initial mode, the doll enters the learning mode wherein it requires both kisses and speech from the child in order to learn. After many passes through the learning mode, when the doll has "learned" as much as it can, the doll enters the smart mode wherein the only action required of the child is speech. In the smart mode, the doll does not appear to be learning anything new, but continues to respond to speech on the part of the child with sentences which evidence what it has learned. If the doll is kissed while it is in the smart mode, or if at any time a special "forget" switch is actuated, the doll returns to the initial mode. In FIG. 1, the respective beginnings and endings of the initial mode, the learning mode, and the smart mode are indicated by appropriately labeled horizontal broken lines.

The doll is initially in the sleep mode, the sleep mode actually being a "power off" mode. The doll is "awakened" or put in a "power on" mode (see box 10) by receipt of a kiss. It then proceeds to process the kiss (see box 12) as set forth in the "process kiss" subroutine illustrated in FIG. 2. In this "process kiss" subroutine, the doll (and more specifically a microprocessor means thereof) senses the status of a manually operable forget switch (see box 14) and determines whether or not the switch is actuated (see box 15). If the forget switch is actuated, the pointer or index indicating the number of the word to be processed is reset to zero (see box 16). Otherwise (that is, if the forget switch is not actuated), the doll makes a kissing sound (see box 18) and then makes one of a variety of differing "giggle" sounds (see box 20) prior to returning to the main routine of FIG. 1. Once the kiss has stopped (see box 22), the doll determines whether or not it is in the smart mode (see decision diamond 24).

Assuming that the doll is not in the smart mode, it then enters the initial mode and prompts the child to kiss it by speaking a kiss prompt sentence. (see box 26). After issuing the prompt, the doll waits for a kiss (see decision diamond 28). If it receives the kiss, it then processes the kiss (see box 30) according to the subroutine already described in connection with FIG. 2 and then enters the learning mode. On the other hand, if a kiss is not received within a first predetermined time, a "timeout" occurs. If this is only the first or second timeout (see decision diamond 32), then the doll returns to the initial mode and again requests a kiss (see box 26). But if this is the third timeout, the doll then says "Bye, bye" or a like termination sentence (see box 34) and enters the sleep or "power off" mode (see box 36). Clearly the number of timeouts required before the doll enters the sleep mode can be selected to be less or greater than three.

Upon entering the learning mode, the doll says an "unlearned word," the specific "unlearned word" being determined by the word number index (see box 50). The "unlearned word" will be the first unlearned word (a) when the doll has not yet entered the learning mode previously, (b) when the forget mechanism was actuated during processing of the kiss according to the "process kiss" subroutine of FIG. 2, or (c) when the doll enters the initial mode from the smart mode (i.e., after receiving a kiss while in the smart mode, as will be explained below). In order to make the doll more "lovable," it may giggle after saying the unlearned word (see box 50). Having said the unlearned word, the doll performs the listen subroutine (see box 52) as set forth in FIG. 3.

While the initial "unlearned word" will simply be a single mispronounced or incompletely pronounced word. As learning proceeds, the "unlearned word" may be a short series of letters or numbers. In a more advanced phase, the "unlearned word" may be a sentence which is factually untrue and requires correction.

Figure 3:
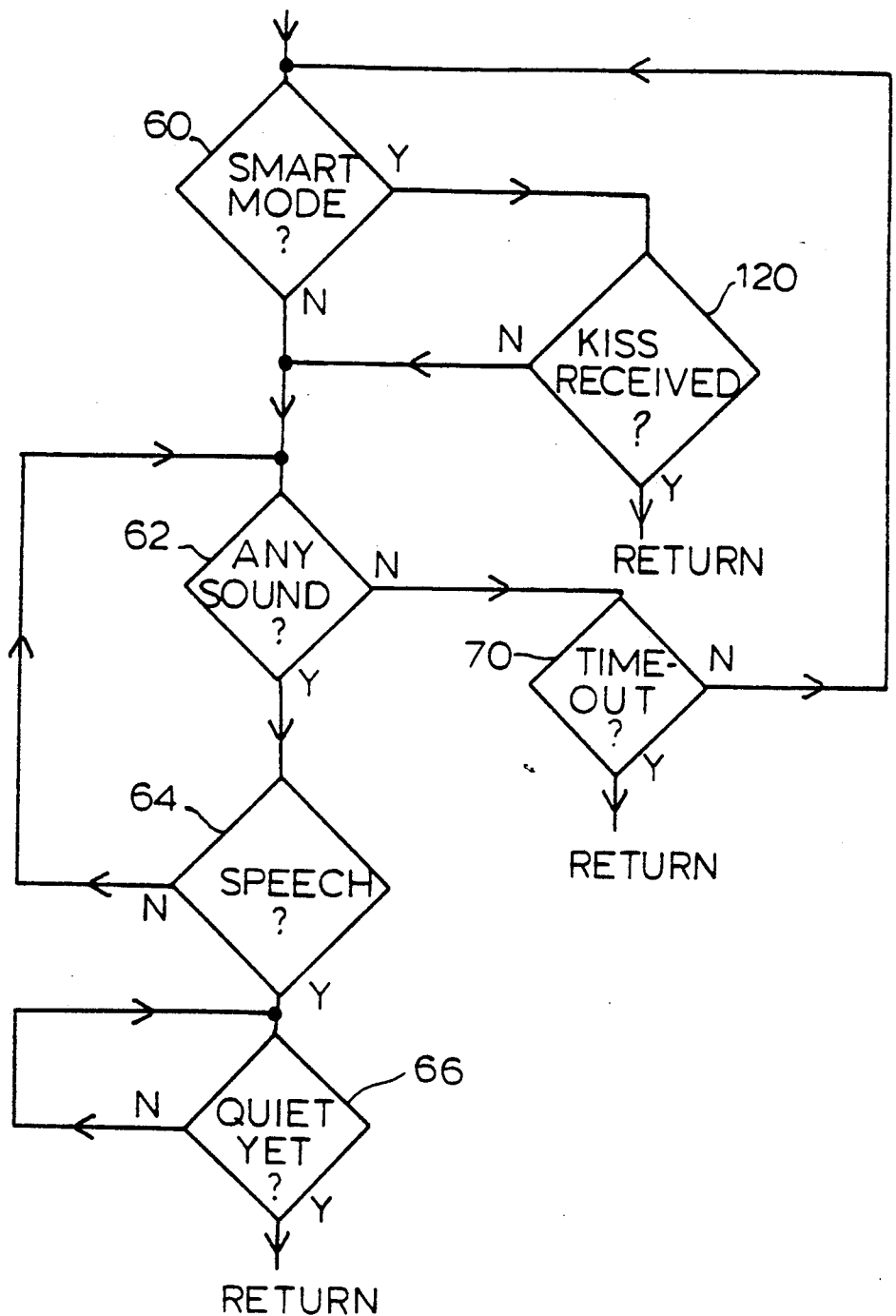
FIG. 3 is a flow chart of the "listen" subroutine.

In the listen subroutine of FIG. 3, the doll first determines whether or not it is in the smart mode (see decision diamond 60). The response of the doll if it is in the smart mode will be discussed hereinafter. If the doll is not in the smart mode, it determines whether or not the speech detection mechanism has detected any sound (see decision diamond 62). If the speech detection mechanism has detected a sound, the doll then determines whether or not that sound is a noise or speech. While any suitable mechanism may be used for this discrimination test, a simple and effective technique is to determine whether or not the sounds are very brief (e.g., less than a second) and thus probably noise or relatively prolonged (e.g., more than a second) and thus probably speech. If the sound is merely noise, the doll then returns to listening for more sound (see decision diamond 62) until it hears speech. If the sound is determined to be speech, the doll waits until the sound has terminated and it is again quiet (see decision diamond 66), thus indicating that the child has stopped talking. Then the doll returns to the main routine of FIG. 1 (see decision diamond 68). As the doll is not actually learning from the child, but merely responding to a speech interaction, it is irrelevant exactly what the child says—the doll will learn in any case as long as there is the requisite interaction.

If there is no sound detected by the sound detection mechanism (see decision box 62) until it hears speech, however, the doll determines whether or not the absence of sound has been prolonged for a predetermined period of time. If so (see decision diamond 70), the listen subroutine is ended with a timeout noted and the doll returns to the main routine of FIG. 1 (see decision diamond 68); if not, the doll returns to the beginning of the "listen subroutine" (see decision diamond 60).

Upon returning to the main routine of FIG. 1 with a timeout noted (see decision diamond 68), the doll determines if there have been three timeouts noted (see decision diamond 72). If so, the doll says, "Bye, bye" or some other termination sequence of sounds (see box 74) and then enters the sleep or "power off" mode (see box 76). However, if there have been fewer than three (or some other predetermined number) of such timeouts, the doll issues a "Talk to me" or like speech-prompting sentence (see box 78) and then returns to the beginning of the learning mode, again repeating the unlearned word (see box 50). On the other hand, if the "listen subroutine" has detected what it considers to be speech, then the doll determines whether or not it has completed the process of learning what was originally the "unlearned word" (see decision diamond 80).

Since the doll is not actually learning, but merely proceeding through a "canned" routine, the determination of whether or not the learning process is complete for that particular unlearned word depends upon whether that "unlearned word" has been said by the doll a predetermined number of times (generally two or three times, depending upon the particular "unlearned word"). If it has not been said the predetermined number of times, the doll returns to the beginning of the learning mode and repeats the unlearned word, either with or without a giggle (see box 50). However, if the learning process for that "unlearned word" has been completed (i.e., the doll has said the "unlearned word" the predetermined number of times), the doll says the now learned word correctly a predetermined number of times (preferably twice) followed by one or more giggles (see box 82). Now that the doll has learned and repeated the word, it uses the word in an "afterlearned" sentence evidencing its mastery of the word—e.g. "Baby loves Mommy" (see box 84). After the doll has learned only the first word (initially incorrectly pronounced "Ma" and thereafter correctly learned to be "Mommy"), the doll may skip saying the afterlearned sentence simply because it has not yet acquired two words and thus cannot make a sentence.

Finally, the index for the word number is incremented (see box 86). The doll then determines whether or not this incremented word number is the last one or not (see decision diamond 88). If it is not, the doll returns to the beginning of the learning mode, saying the new "unlearned word" indicated by the index (see box 50). However, if it is the last word number, the doll has completed the learning phase of its education and now enters the smart mode.

The learning process may be evidenced successively by expanded vocabulary, better grammar, or improved intellect (i.e., factually accurate sentences). Thus, initially the "unlearned" words "Ma," "Dada," and "wove" may be learned to be "mommy," "daddy," and "love," respectively. In a slightly more advanced phase, an incorrect sequence of numbers and letters "3, 1, 2" and "B, A, C," may be learned to be "1, 2, 3" and "A, B, C," respectively. In a final advanced phase, the factually wrong sentences "Duck says, 'Meow, meow'" and "Cat says, 'Ruff, ruff'" may be learned to be "Duck says, 'Quack, quack'" and "Cat says, 'Meow, meow'", respectively, thus evidencing or implying a higher level of intellect and experience.

Upon entering the smart mode, the doll says, "Talk to me" or otherwise prompts the child to speak to it (see box 100). The doll then performs the "listen subroutine" of FIG. 3 (see box 102). However, whereas the "listen subroutine" of FIG. 3 is looking only for speech from the child when it is entered from the learning mode, the "listen subroutine" is looking for either a kiss (see decision diamond 120) or speech (see decision diamond 64) when it is entered from the smart mode. After returning from the "listen subroutine", the doll determines whether it received a timeout, heard speech, or was kissed (see decision diamond 104).

If the doll returned to the smart mode main routine of FIG. 1 after having received a timeout, it determines whether there were three or some other predetermined number of timeouts (see decision diamond 106). If so, it says, "Bye, bye" or some other terminating speech (see box 108) and enters the sleep or "power off" mode (see box 110). If there was a timeout, but there were fewer than the predetermined number of timeouts, the doll returns to the beginning of the smart mode and again says, "Talk to me" or otherwise prompts speech from the child (see box 100).

If the doll returned to the smart mode main subroutine of FIG. 1 after having heard the child speak, it says one of a plurality of after-learned sentences (see box 112) and then returns to the "listen subroutine" of FIG. 3 (see box 102). Assuming that the child responds to each after-learned sentence said by the doll (see box 112) by talking to the doll, the doll will simply continue to say one after another of the after-learned sentences, making sure that no sentence is repeated twice consecutively.

Figure 2:
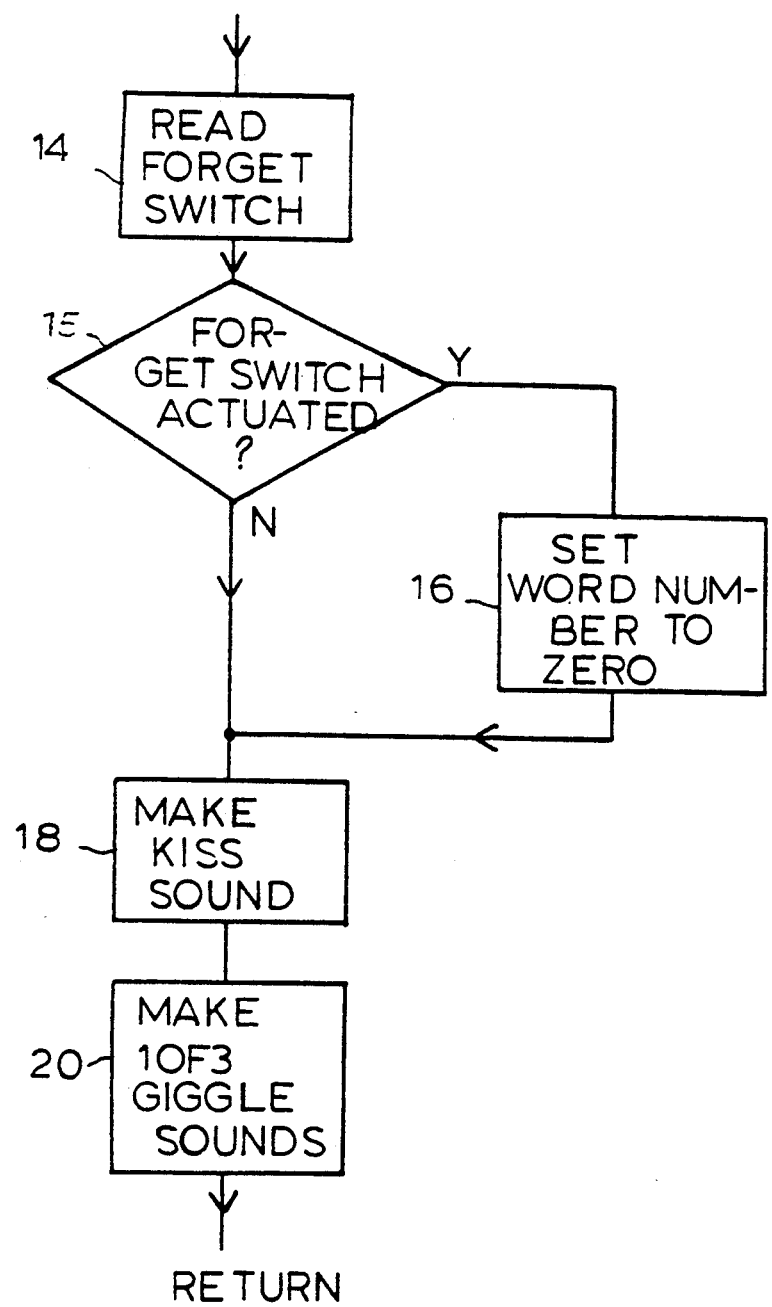
FIG. 2 is a flowchart of the "process kiss" subroutine.

Finally, if the doll returned to the smart mode main routine of FIG. 1 from the "listen subroutine" of FIG. 3 after having been kissed (see decision diamond 120 of FIG. 3), it then performs the process kiss subroutine of FIG. 2 (see box 122), and, after making the appropriate kissing and giggling sounds, resets the word number index to zero (see box 124). This (like actuation of the "forget" switch) has the effect of causing the doll to forget all that it has learned. The doll then returns to the initial mode, issuing a kiss-prompt sentence (see box 26).

Thus the doll stays in the smart mode, once it has reached it, until it is kissed, after which the doll returns to the initial mode with the word number index reset to zero. If the child keeps talking to the doll after each "after-learned sentence" spoken by the doll in the smart mode, the doll remains in the smart mode and continues to talk. If the child does not talk to the doll in the smart mode, the doll eventually enters the sleep mode after a predetermined number of speech-prompts and timeouts, and, when the doll is thereafter reawakened with a kiss (see box 10), it will return to the smart mode (see decision diamond 24) without having to go through the initial or learning modes.

While the length of the learning mode operation may vary greatly, it is preferably about 15-25 minutes. Preferably the doll is capable of over 245 words and phrases and eighty-four sounds in an average play session prior to reaching the smart mode. In the smart mode, hundreds of words and phrases may be spoken by the doll and, indeed, in the smart mode play can be extended indefinitely with proper responses from the child).

Merely speaking to the doll in the learning phase is sufficient to increment the word number index, but the doll will not start to learn a new "unlearned word" (as pointed to by the incremented index) unless the child also kisses the doll when prompted. If the child does not respond with a kiss after the doll has learned a new word, said an after-learned sentence and issued a kiss prompt, the doll will simply go to sleep. Of course, when the doll awakes (after the initial kiss to turn the power on) and proceeds through the initial made (by kissing the doll when prompted), it will start with the new "unlearned word" since the word number index was incremented (see box 86 of FIG. 1) immediately after the prior word was learned. Thus, kissing is the critical factor in the initial mode phase (if it is to be completed), speaking and kissing are the critical factors in the learning mode phase (if it is to continue), and speaking alone is the critical factor in the smart mode phase (if it is to continue).

Figure 4:
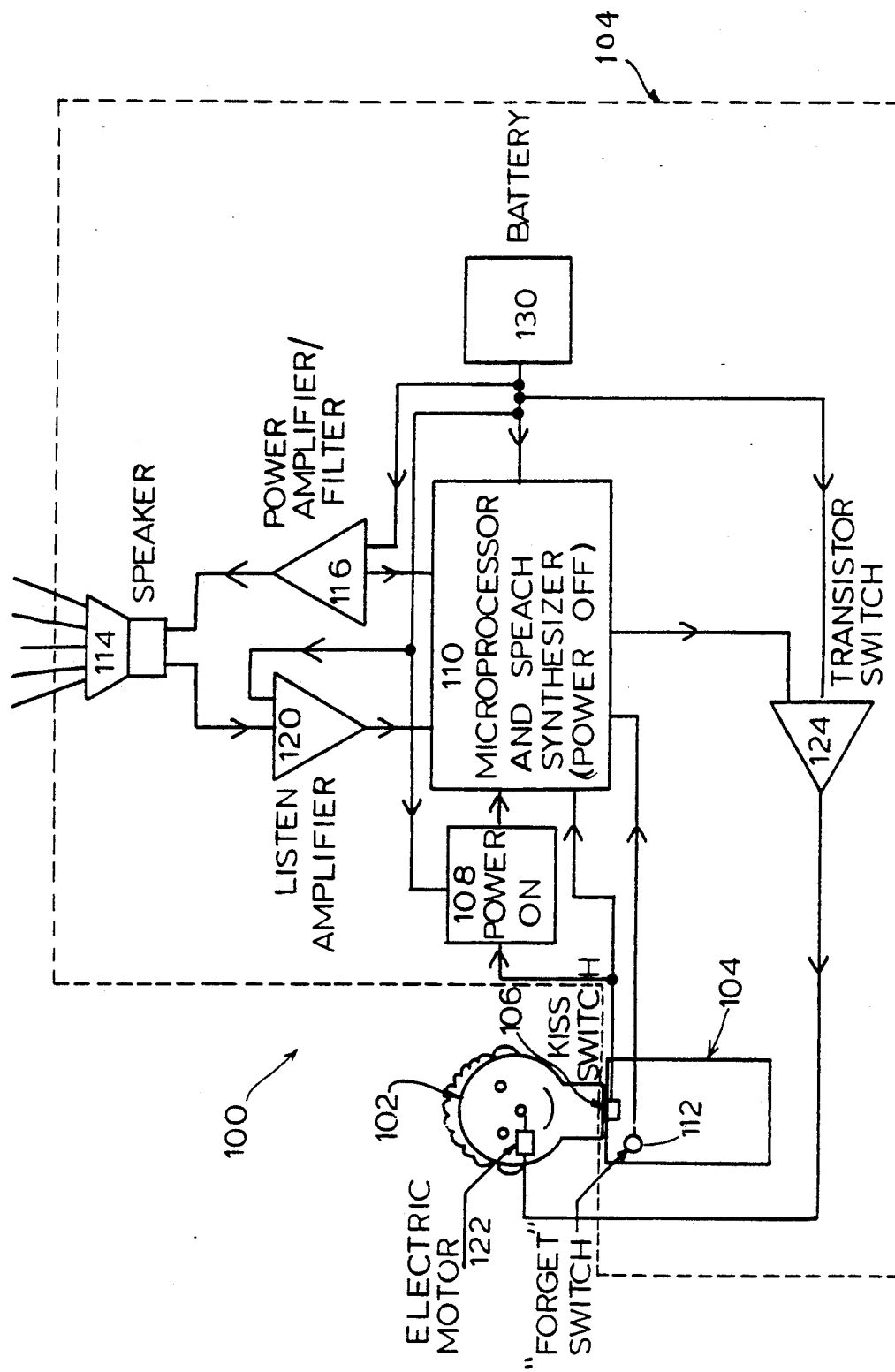
FIG. 4 is a block diagram of the structure of the doll.

Referring now to FIG. 4, therein illustrated is a block diagram of the structure of a doll according to the present invention, generally indicated by the reference numeral 100. Basically speaking, the doll 100 comprises a head generally designated 102 and a body (schematically indicated by a box) generally designated 104. The head 102 is pivotable relative to the body 104 with the neck 105 of the doll (intermediate the head 102 and body 104) including the aforementioned touch detection system or kiss switch 106. Actuation of the doll by a kiss actuates a "power on" switch 108 when the power was previously off and informs the microprocessor and speech synthesizer 110 that the touch detection mechanism has been actuated.

The microprocessor and speech synthesizer 110 delivers sound to the speaker 114 via a power amplifier/filter 116. The filter of the power amplifier/116 is an optional feature and is intended to make the synthesized speech sound more natural, as is conventional in the art, by eliminating the high frequency sounds generated by the synthesizer. The microprocessor and speech synthesizer 110 also detects the presence of sound at the speaker through a listen amplifier 120. The microprocessor and speech synthesizer 110 also performs a "power off" function, so that it can put the doll into the sleep or "power off" mode automatically when the child fails to respond properly after a prompting sequence. Finally, as an optional feature, the microprocessor and speech synthesizer 110 may actuate an electric motor 122 disposed in the head 102 in order to make the doll's lips move intermittently in conjunction (and preferably in synchronization) with the synthesized speech, thereby to make the doll more lifelike. The same motor 122 may also control operation of the eyes or other features of the doll to further lend realism. A transistor switch 124 is typically disposed between the microprocessor and speech synthesizer 110 and the electric motor 122 in order to control operation of the electric motor 122.

A battery 130 is operatively connected to the various components of the doll 100, as required, when power switch 108 is on. With the exception of the electric motor 122 which is disposed in the head 102, and the kiss switch 106 which is disposed in the neck 105 (intermediate the head 102 and the body 104), the main operative components of the doll are disposed either in or on the body 104, as indicated by the broken line area representing the body 104. The manually operable "forget" switch 112 is disposed on the body 104 in a manner and location which permits its intentional actuation when it is desired to restart the learning process from the beginning, yet protects it against being accidentally actuated.

The doll is easy for even a child to operate, issuing touch and talk prompts as necessary and essentially requiring as the only unprompted action that the child commence the interaction with a kiss. Once the child kisses the doll, it awakens the doll and puts it into a "power on" mode. Assuming that the doll is not previously in the smart mode, the doll then proceeds through the initial mode, requesting another kiss. If it doesn't receive the kiss, it repeats a kiss prompt a predetermined number of times and, if still not kissed, says, "Bye, bye" and goes back into the sleep mode; but, if it does receive the kiss, it proceeds into the learning mode. Once in the learning mode, the doll says the currently indexed "unlearned word" and then waits for the child to speak to it. Presumably the child will attempt to correct the "unlearned word" and, when the child stops talking to the doll, the doll will again repeat the "unlearned word." This continues a number of times (generally two or three) until the doll finally says the "unlearned word" correctly (generally twice) and then uses the newly learned word in one or more "after-learned" sentences to evidence its mastery thereof. The process of saying the "unlearned word" a predetermined number of times followed by saying the word correctly (and using it in a sentence) constitutes a learning step since it results in the doll having "learned" a word. Thereafter, the word number index is incremented so that it points to the next "unlearned word," and the doll returns to the initial mode, requesting a kiss. Once the kiss is received, the doll then returns to the learning mode, starting with the new "unlearned word" pointed to by the incremented index.

If, at any time during the time that it is in the learning mode, the doll does not hear speech from the child (thus suggesting that the child has lost interest or is otherwise occupied), the doll issues a predetermined number of speech prompts and, if these fail, says, "Bye, bye" and returns to the sleep mode.

When the doll has completed the learning mode (having learned all the available "unlearned words"), it proceeds into the smart mode, saying a sentence (typically one of the "after-learned sentences"), awaiting a speech response from the child, and then saying another, different sentence. This continues until the child fails to respond verbally, in which case the doll issues a predetermined number of speech prompts and, if these are unsuccessful, says, "Bye, bye" and returns to the sleep mode. However, when the child reawakens the doll from the sleep mode with a kiss, it returns to the smart mode, bypassing the initial and learning modes. If the child kisses the doll while it is in the smart mode, the word number index is reset to zero and the doll returns to the initial mode.

Actuation of the forget switch while the doll is in the initial or learning mode and performing the "process kiss" subroutine also resets the word number index to zero and returns the doll to the initial mode.

It will be appreciated that, except for the initial kiss required to awaken the doll and the operation of the forget switch, all required action on the part of the child is indicated by prompts spoken by the doll.

It will be appreciated that the speech detection means may be deemed deenergized when the doll is awaiting a touch response from the child, just as the touch detection means may be deemed deenergized when the doll is awaiting a speech response from the child. In other words, in effect, a touch will not be detected by the touch detection mechanism in response to a speech prompt, and speech will not be detected by the speech detection mechanisms in response to a touch prompt. The only exception to this is when the doll is in the smart mode, where it detects either speech or touch in response to a speech prompt, the speech response continuing the doll processing in the smart mode, but the touch response having the same effect as actuation of the forget switch and removing the doll from the smart mode.

To summarize, the present invention provides a doll which is apparently capable of learning in response to human interaction, and in particular in response to being kissed and spoken to by a child (or for that matter, an adult). The doll requires constant interaction from the child and thus maintains the interest of the child for a prolonged period of time, especially since the doll initially makes errors, but in response to the interaction with the child, learns to correct these errors.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A doll apparently capable of learning through a combination of human speech and touch interaction, comprising:
   (A) speech generation means for generating upon actuation the currently indexed sound in a predetermined sequence of sounds, said sequence of sounds evidencing a stepwise learning process defined by a plurality of learning steps, each step being composed in turn of a predetermined subsequence of wrong sounds followed by correct sounds;
   (B) speech detection means for detecting human speech when energized and, in response thereto, indexing said subsequence of sounds to the next sound within the current step and actuating said speech generations means, and, at the end of each step, indexing said sequence of sounds to the first sound of the next step and causing said speech generation means to request the selected touch; and
   (C) touch detection means for detecting a selected touch when energized and, in response thereto, for actuating said speech generation means;
   said speech generation means being responsive to each appropriate actuation of said speech and touch detection means for promptly generating the currently indexed sound after deactuation of said speech and touch detection means.

2. The doll of claim 1 additionally including termination means, responsive to non-actuation of said speech detection means for a predetermined period of time, for causing said speech generation means to generate a termination sound, deenergize said speech detection means, and energize said touch detection means.

3. The doll of claim 1 wherein said speech detection means includes means for at least partially discriminating between human speech and other ambient sounds.

4. The doll of claim 1 wherein the last sound of said subsequence of sounds of each step is an improvement over the other sounds of the step.

5. The doll of claim 1 wherein successive steps of said predetermined sequence of sounds evidence an improvement in word vocabulary, correctness of grammar or implied intellect.

6. The doll of claim 1 wherein said speech generation means at the end of each step evidences completion of the step, energizing said touch detection means, deenergizing said speech detection means, and requesting the selected touch.

7. The doll of claim 1 additionally including manually operable forget means for resetting the currently indexed sound of said sequence of sounds to the first sound of the first step.

8. The doll of claim 1 wherein said touch detection means, upon its initial actuation by an initial selected touch, causes said speech generation means to request the selected touch again.

9. The doll of claim 1 wherein, in the absence of the selected touch after a request therefor, said touch detection means after a predetermined time interval after energization thereof causes said speech generation means to generate at least one prompting sound again requesting the selected touch and then, in the absence of the selected touch for a predetermined time, to generate a termination sound.

10. The doll of claim 1 wherein said speech detection means is energized when said touch detection means detects the selected touch and deenergized at the end of each step.

11. The doll of claim 1 wherein said touch detection means is energized at the end of each step and deenergized after it detects the selected touch.

12. A doll apparently capable of learning through a combination of human speech and touch interaction, comprising:
  (A) speech generation means for generating upon actuation the currently indexed sound in a predetermined sequence of sounds, said sequence of sounds evidencing a stepwise learning process defined by a plurality of learning steps, each step being composed in turn of a predetermined subsequence of wrong sounds followed by correct sounds;
  (B) speech detection means for detecting human speech when energized and, in response thereto, indexing said subsequence of sounds to the next sound within the current step and actuating said speech generation means, and, at the end of each step, indexing said sequence of sounds to the first sound of the next step and causing said speech generation means to request the selected touch;
  (C) touch detection means for detecting a selected touch when energized and, in response thereto, for actuating said speech generation means; and
  (D) speech prompting means, responsive to non-actuation of said speech detecting means for a predetermined period of time after energization thereof, for causing said speech generation means to generate at least one speech prompting sound;
  said speech generation means being responsive to each appropriate actuation of said speech and touch detection means for promptly generating the currently indexed sound after deactuation of said speech and touch detection means.

13. The doll of claim 12 wherein said speech prompting means causes said speech generation means to generate a plurality of prompting sounds unless interrupted by actuation of said speech detection means.

14. The doll of claim 12 wherein said speech generation means, after each of said at least one speech prompting sounds, repeats the currently indexed sound.

15. A doll apparently capable of learning through a combination of human speech and touch interaction, comprising:
  (A) speech generation means for generating upon actuation the currently indexed sound in a predetermined sequence of sounds, said sequence of sounds evidencing a stepwise learning process defined by a plurality of learning steps, each step being composed in turn of a predetermined subsequence of wrong sounds followed by correct sounds;
  (B) speech detection means for detecting human speech when energized and, in response thereto, indexing said subsequence of sounds to the next sound within the current step and actuating said speech generations means, and, at the end of each step, indexing said sequence of sounds to the first sound of the next step and causing said speech generation means to request the selected touch;
  (C) touch detection means for detecting a selected touch when energized and, in response thereto, for actuating said speech generations means; and
  (D) touch prompting means, responsive to non-actuation of said touch detection means for a predetermined period of time after energization thereof, for causing said speech generation means to generate at least one touch prompting sound;
  said speech generation means being responsive to each appropriate actuation of said speech and detection means for promptly generating the currently indexed sound after deactuation of said speech and touch detection means.

16. The doll of claim 15 wherein said touch prompting means causes said speech generation means to generate a plurality of touch prompting sounds unless interrupted by actuation of said touch detection means.

17. A doll apparently capable of learning through a combination of human speech and touch interaction and including speech generation means, speech detection means, and touch detection means, comprising:
  (A) speech generation means for generating upon actuation the currently indexed sound in a predetermined sequence of sounds, said sequence of sounds evidencing a stepwise learning process defined by a plurality of learning steps, each step being composed in turn of a predetermined subsequence of wrong sounds followed by correct sounds, and successive steps of said predetermined sequence of sounds evidencing an improvement in word vocabulary, correctness of grammar or implied intellect, said speech generation means at the end of each step evidencing completion of the step, energizing said touch detection means, deenergizing said speech detection means, and requesting the selected touch;
  (B) speech detection means for detecting human speech when energized and, in response thereto, indexing said subsequence of sounds to the next sound within the current step and actuating said speech generations means, and, at the end of each step, indexing said sequence of sounds to the first sound of the next step and causing said speech generation means to request the selected touch; said speech detection means being energized when said touch detection means detects the selected touch and deenergized at the end of each step; and
  (C) touch detection means for detecting a selected touch when energized and, in response thereto, for actuating said speech generation means; said touch detection means being energized at the end of each step and deenergized after it detects the selected touch;
  said speech generation means being responsive to each appropriate actuation of said speech and touch detection means for promptly generating the currently indexed sound after deactuation of said speech and touch detection means;
  (D) speech prompting means, responsive to non-actuation of said speech detection means for a predetermined period of time after energization thereof, for causing said speech generation means to generate a plurality of speech prompting sounds unless interrupted by actuation of said speech detection means, said speech generation means, after each of said at least one speech prompting sounds, repeating the currently indexed sound;
  (E) touch prompting means, responsive to non-actuation of said touch detection means for a predetermined period of time after energization thereof, for causing said speech generation means to generate a plurality of touch prompting sounds unless interrupted by actuation of said touch detection means;

(F) termination means, responsive to non-actuation of said speech detection means for a predetermined period of time after energization thereof, for causing said speech generation means to generate a termination sound, deenergize said speech detection means, and energize said touch detection means; and (G) manually operable forget means for resetting the currently indexed sound of said sequence of sounds to the first sound of the first step.

18. A doll apparently capable of learning through a combination of human speech and touch interaction, comprising speech detection means for detecting human speech, touch detection means for detecting a selected touch, and speech generation means for generating upon actuation the currently indexed sound in a predetermined sequence of sounds, said sequence of sounds evidencing a stepwise learning process defined by a plurality of learning steps, each step being composed in turn by a predetermined subsequence of wrong sounds followed by right sounds, and successive steps of said predetermined sequence of sounds evidencing an improvement in word vocabulary, correctness of grammar, or implied intellect, said speech generation means at the end of each step evidencing completion of the step.

19. A doll comprising touch detection means, speech detection means, short-term learning means responsive to said speech detection means alone and long-term learning means responsive to said touch detection means alone.

* * * * *